Nov. 8, 1955
H. A. HOWELL
2,723,315
METHOD AND MEANS FOR DUPLICATING MAGNETIC RECORDS BY MAGNETIC TRANSFER PHENOMENON
Filed Nov. 5, 1948
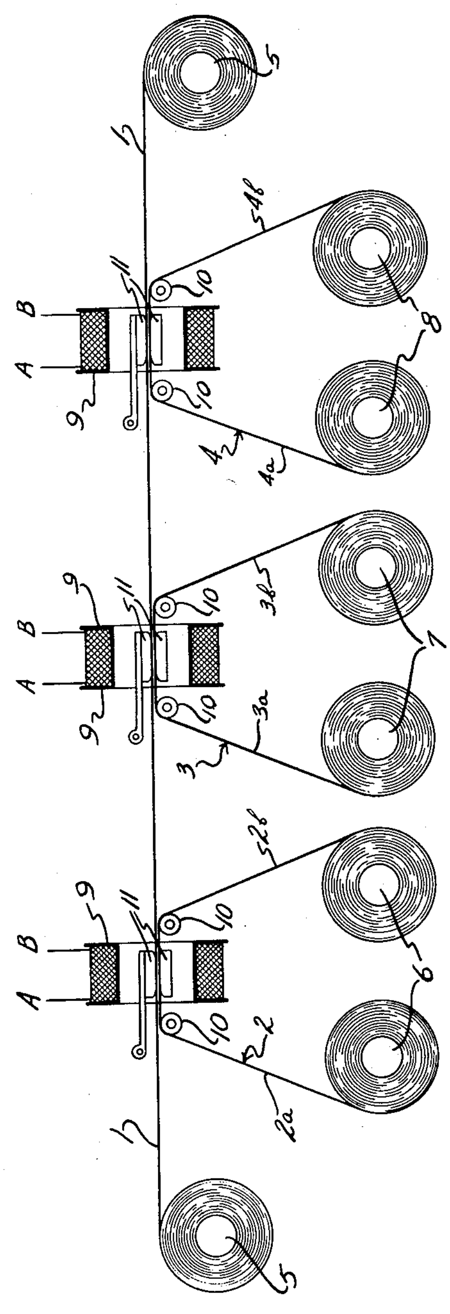
Inventor
Hugh A. Howell
by The Firm of Charles W. Hills
Attys 2,723,315
Patented Nov. 8, 1955

2,723,315

METHOD AND MEANS FOR DUPLICATING MAGNETIC RECORDS BY MAGNETIC TRANSFER PHENOMENON

Hugh A. Howell, Valparaiso, Ind., assignor to The Indiana Steel Products Company, Chicago, Ill., a corporation of Indiana Application November 5, 1948, Serial No. 58,406

1 Claim. (Cl. 179—100.2)

This invention relates to a method of transferring a sound recording from a master magnetic sound record to a copy material thereby producing a duplicate copy suitable for use as a magnetic sound record.

According to one method of producing magnetic sound records, a tape-like record medium made of magnetizable material or coated with magnetizable material is drawn across an electromagnetic transducer head assembly at substantially constant linear speed. The transducer head assembly is usually provided with a suitable non-magnetic gap (which is frequently referred to as an air gap) over which the record tape passes and a magnetic recording field is established in and around the air gap by means of suitable current-conducting exciting elements forming a part of the head assembly.

In order to record upon the record tape, an electric current is caused to flow in the exciting elements in accordance with the time variations of an intelligence produced by music, voice, or other selected audible sound, thereby producing a time-varying magnetic recording field in the area of the non-magnetic gap. As the tape-like record is drawn through this magnetic recording field, magnetization is imparted to incremental lengths of the record in accordance with the time variations of the selected intelligence, thereby producing a specific magnetic pattern in the record medium.

In order to reproduce the audible sound initially selected for translation into an intelligence, the tape-like magnetized record is drawn across the same, or similar transducer head assembly. The specific magnetic pattern present in the record sets up a flux in the core of the head assembly in accordance with the magnetization of the record along incremental portions of its length. As a result, the flux in the core is also a time variant and induces a voltage in the core, with which the flux is linked, in accordance with the time rate of change of the flux. This voltage may be amplified and suitably reproduced by a loud speaker or the like to produce the original selected audible sound.

In accordance with the method of the present invention, a master magnetic sound record is magnetized in accordance with a preselected intelligence in the usual manner, and the magnetized master record is then used in conjunction with a plurality of uniform magnetic transfer fields to induce duplicate magnetic patterns into a plurality of copy record media, thereby producing faithful reproductions of the master magnetic sound recording.

Another object of my invention is to provide a method of simultaneously transferring a preselected magnetic sound recording to a plurality of copy record media.

A further object of my invention is to provide a method whereby cheap and effective duplication of magnetic sound tracks on release prints of motion picture film may be accomplished.

Another object of my invention is to provide a method of duplicating magnetic records by placing two tape-like magnetic sound records face-to-face, one record having a recorded signal, and the other record being a demagnetized blank record, and exposing the records to a space field of alternating current, thereby producing a duplicate copy of the recorded signal.

A further object of my invention is to provide a method for producing duplicate magnetic sound records economically, rapidly and conveniently.

Other objects and features of my invention will become evident to those skilled in the art by reference to the following detailed description and the appended drawing in which I have described the manner of construction, organization and method of operation of a selected embodiment of my invention.

On the drawing:

The single figure is a side elevation diagrammatically illustrating a duplicating device embodying the principles of my invention and employing the method of my invention.

As shown on the drawing:

Referring to the figure, a recorded signal is being transferred from a master magnetic record 1 to a plurality of magnetic copy records 2, 3 and 4, each comprising a demagnetized portion 2*a*, 3*a* and 4*a* and a duplicate record portion 2*b*, 3*b*, and 4*b*.

In following the method of my invention, a magnetic sound recording is made in the usual manner to produce a master magnetic record 1 bearing a preselected recorded signal. The master record 1 is wound on a pair of suitable spools 5 which may be associated with a conventional power take-up device or hand-manipulated take-up reels (not shown).

As shown on the drawing, it is preferable to have the take-up mechanism operate in two directional fashion inasmuch as the direction and speed of the linear travel of the record media may be subjected to wide variations in practice without impairing the efficacy of the method of reproduction constituting the present invention. Thus, the master record 1 may be drawn from left to right, or vice versa, along any linear path defined between the spools 5, thereby affording continuous reproduction of record duplicates.

A plurality of magnetic copy records 2, 3 and 4 are wound onto suitable reel mechanisms indicated generally at 6, 7 and 8, respectively. It will, of course, be understood that each of the reel mechanisms 6, 7 and 8 is constructed in the conventional manner and operates to receive a pair of wound spools which may be wound or unwound in a selected direction depending upon the linear direction of travel of the master magnetic record 1.

Positioned along the linear path traversed by the record media are a plurality of air core solenoids 9, each connected to a source of electric current by a pair of wire leads A and B. The solenoids 9 may be of the conventional 60-cycle A.-C. type which may have their current-conducting windings excited to produce uniform magnetic space fields in and adjacent the air cores of the solenoids.

As may be seen on the drawing, the master magnetic record 1 is threaded through the solenoids 9 and is successively engaged within the area of the solenoid air cores by magnetic copy records 2, 3 and 4 which are threaded over a plurality of rollers 10 and pressed into intimate contact with the master record by a plurality of padded non-magnetic compression means 11.

The only limitation which must be observed with respect to the driving apparatus is that the reel mechanisms 6, 7 and 8 should be driven at a speed which will permit the copy media to travel linearly at the same speed as the master record 1, thereby prohibiting relative slippage when the master and copy records pass through the magnetic space fields.

The duplicating operation is carried out quite simply.

The solenoids are energized with 60-cycle A.-C. excitation current, thereby establishing uniform magnetic transfer fields in the area of the solenoid air cores. The master record 1 is placed in intimate contact with a plurality of magnetic record media, as, for example, copy records 2, 3 and 4 within the magnetic transfer fields. Any given copy record will enter the transfer field as a demagnetized blank portion 2*a* and will leave the transfer field as a duplicate magnetic record 2*b* having had imparted to it, the recorded signal or the magnetic pattern, of the master record 1.

The magnetic phenomena accompanying this transfer are as follows. It is well known that the magnetizing field resulting from two or more differently oriented fields is the vectorial sum of the fields. Thus, in the case of a recorded signal on the master record 1 in the presence of the uniform A.-C. transfer fields produced in the solenoids 9, the actual effective magnetizing field has D.-C. components.

This effect is clearly demonstrated with the use of a hypothetical illustration. If a sinusoidal signal flux configuration is present on the surface of the master record 1, the external flux of the master tape 1 finds a path through each of the neutral copy records 2, 3 and 4 when the record media are placed in intimate face-to-face contact, however, the field strength is not sufficient to cause a satisfactory transfer of the signal to the copy records. By impressing an opposite field in the space around the area of contact of the record media, the effective field in the area of contact will change.

If the value of the uniform magnetic A.-C. space field is equal to or lower than the coercive force of the master record 1 and of sufficient strength to substantially magnetize the magnetic copy records 2, 3 and 4, the area of contact on the magnetic copy records 2, 3 and 4 will be subjected to a real magnetizing force when the space field is in one direction and to a much smaller force in the opposite direction, because the coercive force of the master record 1 effectively cancels the field in one direction.

The algebraic sum of such a condition will result in displaced loops in much the same manner as the use of a high frequency bias in a conventional transducer head used for magnetic recording. Thus, a magnetization in the copy records 2, 3 and 4 is produced which corresponds to the magnetization resulting from the recorded signal appearing on the master record 1.

It has been found that space fields may be oriented up to 90° without causing any detrimental effect on the transfer process since the effective resultant fields simply decrease as the space field is oriented.

It follows from the foregoing explanation that the master record 1 should preferably be of a material having a proportionately higher coercive force than the magnetic copy records 2, 3 and 4. It also follows that the strength of the magnetic transfer field should be high enough to effectively magnetize the copy media. In practice, it has been found desirable to use a master record having a coercive force ($H_c$) of at least 500 oersteds and copy records having a coercive force ($H_c$) in the range of 250 to 300 oersteds. In other words, it is desirable that the master record have a coercive force about 200 oersteds higher than the copy record, although successful transfer may also be had when the difference is as low as 100 oersteds. By using record media having these characteristics, the magnetic transfer field may be safely brought to a strength of 300 oersteds without impairing the recorded signal upon the master record and the effective transfer field will be such as to nearly saturate the magnetic copy records in the direction of the resultant field.

It is also important that face-to-face contact of the record media extend sufficiently beyond the entrance and the exit edges of the solenoids 9 so as to prevent demagnetization of the duplicated magnetic pattern.

To that end, the compression means 11 may be of such construction as to incorporate suitable resilient members for a firm resilient face-to-face contact of the record media in the area of the transfer field. Such a structure also insures against "smudging" of the master signal because of relative slippage between the record media while in the magnetic transfer field.

It will be apparent to those versed in the art that I have described a means for duplicating magnetic records by magnetic transfer phenomena which facilitates the rapid, convenient and economical production of duplicate magnetic records.

It will, of course, be understood that the various details of construction and the various details of procedure may be varied throughout a wide range without departing from the principles of this invention and it is, therefore, not the purpose to limit the patent granted hereon otherwise than necessitated by the scope of the appended claim and the prior art.

I claim as my invention:

A mechanism for duplicating magnetic records including, in combination, a driving means including spool means for receiving and paying out a lengthy flexible material, a magnetized master record tape wound on said spool means, a plurality of air core transfer solenoids in spaced longitudinal alignment for establishing uniform magnetic transfer fields in said air cores, press means in said air cores for resiliently engaging flat sliding elements therebetween, a plurality of take-up reel mechanisms each including spool means for receiving and paying out a lengthy flexible material, a plurality of demagnetized copy record tapes wound on said spool means, each of said copy record tapes being successively and respectively threaded through said press means in a corresponding one of said air cores together with said master record for subjection to said magnetic transfer fields in said air cores.

References Cited in the file of this patent

UNITED STATES PATENTS

| | | |
|---|---|---|
| 873,042 | Hagemann | Dec. 10, 1907 |
| 873,541 | Hagemann | Dec. 10, 1907 |
| 1,815,010 | Pollock | July 14, 1931 |
| 1,828,260 | Stille | Oct. 20, 1931 |
| 2,327,956 | Begun | Aug. 24, 1943 |

FOREIGN PATENTS

| | | |
|---|---|---|
| 880,559 | France | Mar. 30, 1943 |

OTHER REFERENCES

S. M. P. E. Journal, pages 87, 88, January 1949.